J. W. HUGHES.
SLIP GEAR.
APPLICATION FILED JAN. 9, 1908.
950,290.
Patented Feb. 22, 1910.
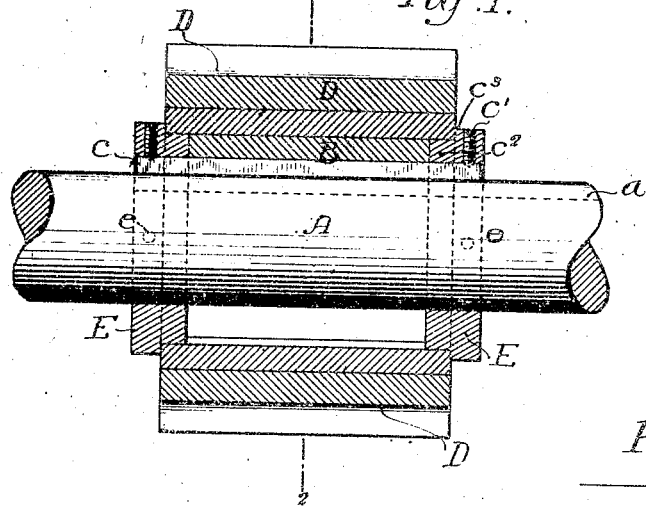
Fig. 1.
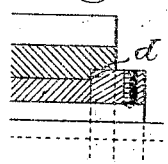
Fig. 4.
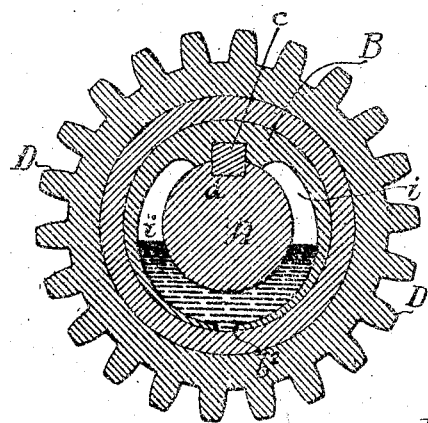
Fig. 2.
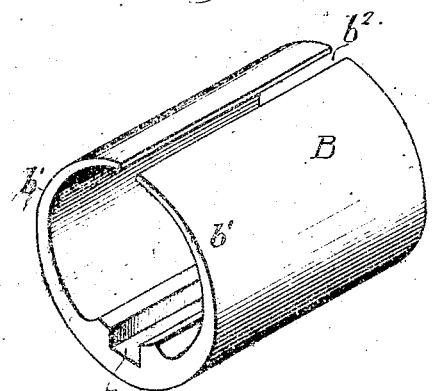
Fig. 3.
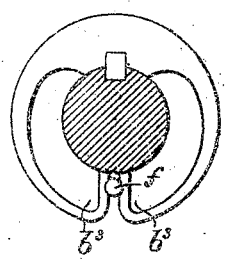
Fig. 5.
Fig. 6.
Witnesses:
William H. Rover.
Walter Thiem.
Inventor
James W. Hughes
by his Attorneys
Howson & Howson

UNITED STATES PATENT OFFICE.

JAMES W. HUGHES, OF PHILADELPHIA, PENNSYLVANIA, ASSIGNOR TO LINK-BELT COMPANY, OF CHICAGO, ILLINOIS, A CORPORATION OF ILLINOIS.

SLIP-GEAR.

950,290.  Specification of Letters Patent.  Patented Feb. 22, 1910.

Application filed January 9, 1908. Serial No. 409,947.

*To all whom it may concern:*

Be it known that I, JAMES W. HUGHES, a citizen of the United States, residing in Philadelphia, Pennsylvania, have invented certain Improvements in Slip-Gears, of which the following is a specification.

The object of my invention is to provide a simple and accurate means for coupling a gear, sprocket or other wheel to a shaft so that when the gear is subjected to undue strains or shocks it will slip upon the shaft. This object I attain in the following manner, reference being had to the accompanying drawing, in which:—

Figure 1, is a longitudinal sectional view illustrating my invention as applied to a gear wheel; Fig. 2, is a sectional view on the line 2—2, Fig. 1; Fig. 3, is a perspective view of the spring member which is mounted between the gear wheel and the shaft; and Figs. 4 and 5, are views illustrating modifications of my invention. Fig. 6, is a detached perspective view of the tapered pin shown in Fig. 5.

A is a shaft having a key-way $a$.

B is a spring member in the form of a sleeve which is mounted upon the shaft and is made as clearly shown in Fig. 3, having a slot $b$ which alines with the key-way in the shaft A and is locked to the shaft by a key $c$. The two portions $b'$, $b'$ of this sleeve are free at their outer ends and can be drawn toward each other by pressure but will expand when the pressure is relieved due to the spring of the metal. Collars E, E are situated at each end of the spring member and the wheel D is mounted upon these collars and held central thereby in respect to the shaft. The collars being secured to the shaft by set screws $e$, $e$ prevent any longitudinal movement of the parts on the shaft. The key $c$ extends through the key-ways in the collars as well as through the ways in the spring member B and the set screw $e'$ in one or both of the collars firmly locks the key against longitudinal movement.

The collars shown in Fig. 1 are reduced at one side $e^2$ to form shoulders $e^3$ to receive the end thrust of the gear wheel and the reduced portions $e^2$ enter the cavity, forming a bearing for the wheel, but the collars E, E may rest in recesses in the end of the gear wheel D and against shoulders $d$ on the wheel, as shown in Fig. 4, if desired. Thus the parts are held rigidly together against longitudinal movement, and the collars and the spring member are firmly secured to the shaft by the key, while the wheel D is only held to the shaft through the friction of the spring member B.

While I have shown a gear wheel in the drawing it will be understood that my invention can be applied to a sprocket wheel as well or to a belt wheel if desired, although the invention is particularly adapted to sprocket and gear wheels where the wheel is subjected to a strain and shock in starting and stopping.

The cavity $i$ between the portions $b'$ of the spring member and the shaft is preferably filled with grease which may escape through the opening $b^2$ between two members $b'$, thus lubricating the bearing surface of the spring member which is in contact with the wheel.

To apply the spring member, the side portions $b'$ are drawn together so that the spring member will enter the opening in the sprocket, then it is forced into place under pressure, after which it is mounted upon the shaft with the gear wheel and the collars are set in position and secured to the shaft.

In manufacturing the spring sleeve I preferably make it in a single casting, dividing the two sections by cutting away a part of the cylinder to form the opening or slot $b^2$. I can make the side sections $b'$ of any thickness desired.

In Fig. 5, I have shown means for taking up the wear between the sleeve and the wheel and in this instance I make the spring member with inwardly extending flanges $b^3$ and between the inner ends of these flanges is mounted a tapered pin $f$ having a nut at one end, so that on screwing the nut upon the pin the two parts $b'$ of the spring member will be forced apart. The flanges $b^3$ will yield with the side members $b'$ when the wheel is subjected to severe shocks or strains.

Thus it will be seen that I provide a very simple and substantial device for coupling a gear or sprocket wheel or belt wheel to a shaft, which, when subjected to severe strains or shocks, will yield, preventing the breaking of the teeth of the sprocket or gear wheel, or the breaking of the driving mechanism.

I claim:—

1. The combination of a shaft; a hollow wheel section loose thereon; a spring section secured to the shaft and having two curved integral spring arms tending to expand of themselves and normally bearing against the inner surface of the wheel section; said arms being capable of permitting the wheel section to slip when subjected to undue strains and shocks.

2. The combination of a shaft, two collars mounted thereon and spaced apart, a hollow wheel section mounted on the collars, and a spring member secured to the shaft and having two curved spring sections bearing against the inner surface of the hollow wheel section between the collars, the wheel section being held to the shaft by the pressure of the spring section.

3. The combination of a shaft, two solid collars mounted thereon, and spaced apart, a wheel section mounted on the collars and the spring member secured to the shaft and having two spring sections curved and adapted to normally press upon the inner surface of the wheel section, the cavity between the collars forming a grease receptacle.

4. The combination of a shaft having a key-way therein, collars on the shaft, a wheel on the collars, a spring member mounted on the shaft between the collars, said spring member having a central portion with a longitudinal key-way therein, and having two side sections in the form of springs, the wheel being held to the shaft by the pressure of the side sections of the spring member, each collar having key-ways and a key adapted to the key-way in the shaft and the key-ways in the spring member and collars.

5. The combination of a shaft, a spring member thereon having spring portions at each side curved to conform to the bore of a wheel and having inturned spring flanges, means mounted between the flanges some distance from the periphery of the spring member for spreading the side sections apart, and a wheel mounted on the spring member, the whole being so constructed that the spring portions and their flanges will yield when the wheel is subjected to severe shocks and strains.

In testimony whereof, I have signed my name to this specification, in the presence of two subscribing witnesses.

JAMES W. HUGHES.

Witnesses:
    Jos. H. KLEIN,
    WM. A. BARR.